United States Patent
Waisbard et al.

(10) Patent No.: US 10,095,882 B2
(45) Date of Patent: Oct. 9, 2018

(54) PRIVATE DATA PROCESSING IN A CLOUD-BASED ENVIRONMENT

(71) Applicant: Cisco Technology Inc., San Jose, CA (US)

(72) Inventors: Erez Waisbard, Or-Yehuda (IL); Anna Schnaiderman, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/462,012

(22) Filed: Aug. 18, 2014

(65) Prior Publication Data
US 2015/0082019 A1    Mar. 19, 2015

(30) Foreign Application Priority Data
Sep. 17, 2013  (IL) .......................................... 228523

(51) Int. Cl.
*H04L 29/06*  (2006.01)
*G06F 21/62*  (2013.01)

(52) U.S. Cl.
CPC ...... *G06F 21/6245* (2013.01); *H04L 63/0435* (2013.01); *H04L 63/068* (2013.01)

(58) Field of Classification Search
CPC .............. H04L 63/0435; H04L 63/068; G06F 21/6245
USPC ....................................................... 713/150
See application file for complete search history.

(56) References Cited

U.S. PATENT DOCUMENTS

| | | | |
|---|---|---|---|
| 4,850,017 A * | 7/1989 | Matyas, Jr. ............. | H04L 9/088 380/280 |
| 5,940,507 A * | 8/1999 | Cane ..................... | G06F 21/602 380/277 |
| 5,982,520 A * | 11/1999 | Weiser .................. | G06F 1/1626 398/107 |
| 6,577,735 B1 * | 6/2003 | Bharat ................. | G11B 27/034 380/286 |
| 6,779,115 B1 * | 8/2004 | Naim ..................... | G06F 21/10 380/278 |

(Continued)

OTHER PUBLICATIONS

Majumdar, S., 'On End-To-End Encryption for Cloud-Based Services', Suryadipta Majumdar, 2014, entire document, https://users.encs.concordia.ca/~mmannan/student-resources/Thesis-MASc-Majumdar-2014.pdf.*

(Continued)

*Primary Examiner* — Luu Pham
*Assistant Examiner* — Ronald Baum
(74) *Attorney, Agent, or Firm* — Merchant & Gould P.C.

(57) ABSTRACT

In one embodiment, a method for securing data on a semi-trusted server is implemented on a computing device and includes: receiving at least a current session key from a user device for use during a current session, where the current session key is suitable for encrypting data and for decrypting data encrypted with the current session key, decrypting communications received from the user device during the session with said session key, encrypting with the session key at least one of communications to be sent to said user device and personal data generated during the session, storing the encrypted personal data, and discarding the current session key upon completion of the session, thereby limiting possible access to the stored encrypted personal data other than during the session. Related apparatus and methods are also described.

17 Claims, 1 Drawing Sheet

(56) References Cited

U.S. PATENT DOCUMENTS

| | | | |
|---|---|---|---|
| 7,438,233 B2* | 10/2008 | Leiper | 235/487 |
| 7,634,809 B1* | 12/2009 | Schneider et al. | 726/22 |
| 7,657,751 B2* | 2/2010 | Micali et al. | 713/176 |
| 7,958,355 B2* | 6/2011 | Blank | H04L 9/0827 380/270 |
| 8,639,625 B1* | 1/2014 | Ginter et al. | 705/51 |
| 8,713,309 B2* | 4/2014 | Buer | G06Q 20/3674 380/277 |
| 8,745,755 B2* | 6/2014 | Borzycki et al. | 726/27 |
| 8,837,741 B2* | 9/2014 | Hawkes | H04L 63/067 380/270 |
| 8,948,381 B2* | 2/2015 | Song | 380/277 |
| 8,949,575 B2* | 2/2015 | Boersma | G06F 15/76 712/229 |
| 2002/0073309 A1* | 6/2002 | Kurn | H04L 9/083 713/155 |
| 2002/0136410 A1* | 9/2002 | Hanna | H04L 9/088 380/277 |
| 2002/0157089 A1* | 10/2002 | Patel | G06F 8/65 717/178 |
| 2002/0194501 A1* | 12/2002 | Wenocur | G06Q 10/107 726/4 |
| 2003/0016821 A1* | 1/2003 | Hammersmith | H04L 9/0822 380/37 |
| 2003/0021416 A1* | 1/2003 | Brown | H04L 63/04 380/277 |
| 2003/0033523 A1* | 2/2003 | McNulty | G06F 21/44 713/168 |
| 2003/0163704 A1* | 8/2003 | Dick et al. | 713/178 |
| 2003/0217258 A1* | 11/2003 | Bade | H04L 63/0442 713/150 |
| 2004/0054630 A1* | 3/2004 | Ginter | H04N 21/8358 705/53 |
| 2004/0146015 A1* | 7/2004 | Cross | G06Q 20/3829 370/328 |
| 2004/0218762 A1* | 11/2004 | Le Saint | H04L 63/0421 380/277 |
| 2005/0033959 A1* | 2/2005 | Zheng | G06F 21/78 713/169 |
| 2005/0210249 A1* | 9/2005 | Lee | G06F 21/10 713/168 |
| 2005/0220064 A1* | 10/2005 | Hundscheidt et al. | 370/342 |
| 2005/0232426 A1* | 10/2005 | Konersmann | H04L 63/0428 380/277 |
| 2006/0005026 A1* | 1/2006 | Song | H04L 9/0844 713/173 |
| 2006/0236091 A1* | 10/2006 | Kaji | H04L 29/06027 713/150 |
| 2007/0076889 A1* | 4/2007 | DeRobertis | H04L 9/0825 380/279 |
| 2007/0208930 A1* | 9/2007 | Blank | H04L 9/0827 713/150 |
| 2007/0248232 A1* | 10/2007 | Driscoll | H04L 9/0822 380/280 |
| 2008/0019526 A1* | 1/2008 | Fu | H04L 9/0822 380/277 |
| 2008/0052770 A1* | 2/2008 | Ali | G06F 21/34 726/9 |
| 2008/0205651 A1* | 8/2008 | Goto | G06F 21/71 380/277 |
| 2009/0092252 A1* | 4/2009 | Noll | H04L 9/083 380/277 |
| 2009/0138699 A1* | 5/2009 | Miyazaki | G06F 21/57 713/150 |
| 2009/0327746 A1* | 12/2009 | Greco | G06F 21/602 713/189 |
| 2010/0107258 A1* | 4/2010 | Park | G06F 21/10 726/26 |
| 2010/0332845 A1* | 12/2010 | Asaka | H04L 63/061 713/189 |
| 2011/0145592 A1* | 6/2011 | Greiner | G06F 21/602 713/189 |
| 2011/0311055 A1 | 12/2011 | Parann-Nissany | |
| 2012/0275597 A1* | 11/2012 | Knox et al. | 380/210 |
| 2013/0148807 A1* | 6/2013 | Schwager | H04L 9/0861 380/270 |
| 2013/0212367 A1* | 8/2013 | Ingalls | G06F 21/88 713/2 |
| 2014/0164774 A1* | 6/2014 | Nord | G06F 21/602 713/171 |

OTHER PUBLICATIONS

PKWARE, 'Smart Encryption Key Management', PKWARE, 2016, entire document, https://pkware.cachefly.net/webdocs/pkware_pdfs/us_pdfs/white_papers/WP_KeyMgmt.pdf.*

"Cloud Computing," (Wikipedia Aug. 22, 2014).

* cited by examiner

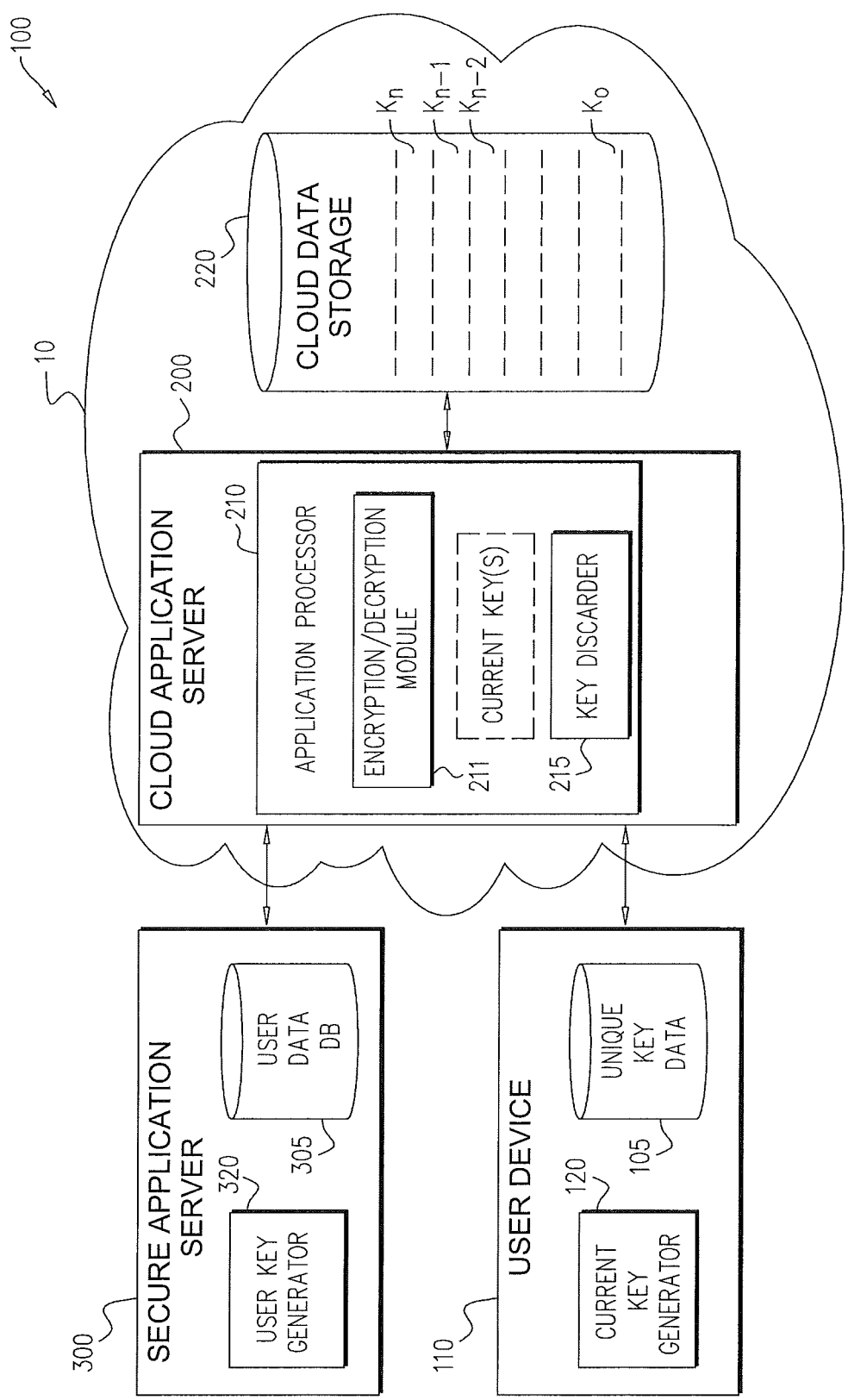

PRIVATE DATA PROCESSING IN A CLOUD-BASED ENVIRONMENT

FIELD OF THE INVENTION

The present invention relates in general to processing private data in a cloud-based environment, and particularly, but not exclusively, to securing the private data against attacks on the processing server.

CROSS REFERENCE

The present application claims the benefit of priority from Israel Patent Application IL 228523, filed Sep. 17, 2013.

BACKGROUND OF THE INVENTION

The following reference is believed to represent the state of the art:
U.S. patent application Ser. No. 13/160,535, METHODS, DEVICES, AND MEDIA FOR SECURE KEY MANAGEMENT IN A NON-SECURED, DISTRIBUTED, VIRTUALIZED ENVIRONMENT WITH APPLICATIONS TO CLOUD-COMPUTING SECURITY AND MANAGEMENT, by Gilad Parann-Nissany, filed Jun. 15, 2011.

BRIEF DESCRIPTION OF THE DRAWINGS

The present invention will be understood and appreciated more fully from the following detailed description, taken in conjunction with the drawing in which:
The drawing is a schematic illustration of a cloud-based semi-trusted personal data processing system, constructed and operative in accordance with embodiments of the present invention.

DESCRIPTION OF EXAMPLE EMBODIMENTS

Overview
A method for securing data on a semi-trusted server is implemented on a computing device and includes: receiving at least a current session key from a user device for use during a current session, where the current session key is suitable for encrypting data and for decrypting data encrypted with the current session key, decrypting communications received from the user device during the session with said session key, encrypting with the session key at least one of communications to be sent to said user device and the personal data generated during the session, storing the encrypted personal data, and discarding the current session key upon completion of the session, thereby limiting possible access to the stored encrypted personal data other than during the session.

A method for controlling access to personal data stored on a semi-trusted server is implemented on a computing device and includes: sending a current session key from a client device to the semi-trusted server, where the semi-trusted server is configured to use the current session key to encrypt and decrypt personal data associated with the client device and to store the encrypted personal data with current session key, encrypting communications to be sent to the semi-trusted server with the current session key, and decrypting communications received from the semi-trusted server with the current session key.

DETAILED DESCRIPTION OF EXAMPLE EMBODIMENTS

The terms "scrambled" and "encrypted", in all of their grammatical forms, are used interchangeably throughout the present specification and claims to refer to any appropriate scrambling and/or encryption methods for scrambling and/or encrypting data, and/or any other appropriate method for intending to make data unintelligible except to an authorized entity. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

In cloud based computing environments, a user's personal data may be stored and/or processed on a cloud server. Such cloud servers may be considered to be "semi trusted" machines; trusted to the extent that the user may trust the cloud service provider (CSP) not to knowingly misuse or expose the user's personal data, but perhaps not quite entirely trusted to fend off repeated attacks by unauthorized parties that may typically attempt to "crack" a cloud server's security. Given these circumstances, it will be appreciated that using a cloud server to store and/or process a user's personal data may entail risking the exposure of the data to unauthorized parties.

The inventors of the present invention have realized that while a cloud server may be exposed to the risk of a successful attack, the operator may typically recover control and reinforce proper security relatively quickly after the attack has been made. Accordingly, the risk of exposure or misuse of personal data may be significantly reduced by limiting the amount of such personal data that may actually be accessible at the time of the attack.

In accordance with an embodiment of the present invention, access to stored personal data may be limited by encrypting it with a key provided by the user. The key itself may be discarded by the cloud server after the personal data may be encrypted. Therefore, even in the event of a successful attack that may allow a hacker to access the stored personal data, it may still be protected from misuse by encryption, particularly since the key required for decryption may not be available for the hacker to find and use on the cloud server.

It will, however, be appreciated that it may be necessary at some point for a cloud server to process the personal data "in the clear", i.e. as decrypted personal data. To enable such processing, the user may provide the key to the cloud server as necessary to selectively decrypt the personal data required for processing. Updates to the personal data resulting from the processing may be then encrypted using the key, and then the key may be discarded.

It will therefore be appreciated that if a successful attack may be launched on the cloud server during such processing, the key may be used by the attacker to decrypt the stored personal data as well. As will be disclosed hereinbelow, the exposure to damage from an attacker acquiring the encryption key may be limited by periodic replacement of the key by the user. The stored personal data may be therefore be effectively segmented in accordance with which key was used to encrypt it. Accordingly, only the personal data encrypted with the current encryption key may be decrypted by the key in use during an attack. Any personal data encrypted with a previous key may still be protected even in the event of a successful attack.

Reference is now made to the drawing which illustrates a cloud-based semi-trusted personal data processing system 100, constructed and operative in accordance with embodiments of the present invention. System 100 comprises cloud application server 200 situated within cloud 10 and in communication with user device 110. Cloud application server 200 is configured to store personal data associated with user device 110 on cloud data storage unit 220. It will be appreciated that cloud application server 200 may be implemented on any suitably configured computing device or combination of such devices. It will similarly be appreciated that while for ease of reference cloud data storage unit 220 may be depicted as a single unit, in practice, unit 220 may be a virtual aggregation of a multiplicity of data storage units.

Cloud application server 200 comprises application processor 210. Application processor 210 may be any suitable application processor that is configured to process a user's personal data. For example, cloud application server 200 may be configured as part of a cloud-based television headend. In such a case, application processor 210 may be an electronic program guide (EPG) processor configured to provide a personalized EPG to user device 110 as per personal data stored on cloud data storage unit 220. In other exemplary configurations, cloud application server 200 may provide medical record sharing services or statistical analysis systems.

User device 110 comprises current key generator 120 and unique key data storage 105. Current key generator 120 may be configured to generate encryption/decryption keys as a function of unique user parameters and key material. Such unique user parameters may be, for example, unique IDs and access rights. Such key material may be, for example, a function of parameters such as one or more random numbers, key periods and user passwords/secrets. Current key generator 120 may also be configured to use a key ladder function as part of the key generation process. Each encryption/decryption key created by current key generator 120 may be stored in unique key data storage 105.

In operation, at the beginning of each session with cloud application server 200, user device 110 may forward the current session key, i.e. the most recently generated encryption/decryption key to cloud application server 200. It will be appreciated that the current session key may be forwarded securely, for example, using a secure authentication channel or an encrypted channel. Once the current session key may be so forwarded to cloud application server 200, all further communications between user device 110 and cloud application server 200 during the same session may be encrypted for transmission by this current session key, and decrypted by the recipient using the same current session key.

Application processor 210 comprises encryption/decryption module 211. Encryption/decryption module 211 is configured to encrypt and decrypt the data processed by application processor 210 as necessary. Module 211 may be implemented as a software module, or alternatively as a hardware component. The current session key may be used by encryption/decryption module 211 to decrypt personal data associated with user device 110 that application processor 210 may retrieve from cloud data storage unit 220 as necessary for the required processing. For example, application processor 210 may retrieve personal data relating to previous usage by the user of user device 110, and then process it "in the clear" to generate a personalized EPG for user device 110. Encryption/decryption module 211 may then encrypt the personalized EPG using the current session key and application processor 210 may return the resulting encrypted personalized EPG to user device 110. After, or during processing, the current session key may also be used by encryption/decryption module 211 to encrypt relevant personal data for storage, and application processor 210 may store the encrypted personal data on cloud data storage unit 220.

Application processor 210 may also comprise key discarder 215. After application processor 210 may complete a processing session vis-à-vis user device 110, it may invoke key discarder 215 to discard the current session key. Key discarder 215 may employ any suitable means for discarding the current session key and removing traces of it from accessible memory. For example, key discarder 215 may overwrite the relevant memory location with random data to discard the current key.

User device 110 may be configured to invoke current key generator 120 to generate new current session keys as per a schedule and/or on demand. As the current session key used by application processor 210 may therefore change from time to time, there may be a resulting segmentation effect on the personal data stored in cloud data storage unit 220. Accordingly, the personal data associated with a specific user device 110 in cloud data storage unit 220 may be segmented according to session keys that were used in previous sessions. For example, the personal data may be segmented according to the series of keys K0 to Kn, where K0 may be the earliest encryption/decryption key for which personal data may have previously been stored, and Kn may be the current encryption/decryption key, i.e. the current session key.

It will therefore be appreciated that some of the personal data required for processing by application processor 210 may not have been encrypted using the current session key, i.e. Kn, but rather a previous session encryption/decryption key such as, for example, Kn−1. In such a case, application processor 210 may be unable to perform the required processing without access to Kn−1. Accordingly, when application processor 210 may process personal data from a period before the generation of the current session key, user device 110 may forward the relevant previous session encryption/decryption key(s), i.e Kn−1, to cloud application server 200 from unique key data storage 105. The previous session key(s) may be discarded by key discarder 215 after decrypting the associated personal data retrieved from cloud data storage unit 220.

It will be appreciated, however, that one or more previous session keys may be used in parallel with the current session key. As discussed hereinabove, new personal data derived while processing the personal data from previous sessions, may be encrypted with the current session key prior to storing it on cloud data storage unit 220. Similarly, the personal data generated during the session by application processor 210, i.e. a personalized EPG, may also be encrypted for transmission to user device 110 with the current session key, i.e. Kn, regardless of which previous session key may have been used to decrypt the personal data used to generate personal data during the current session. It will be appreciated, however, that system 100 may also be configured to prevent the re-encryption of some or all data with the current key, i.e. Kn, if it had previously been encrypted with an earlier key, i.e. Kn−1. For example, if cloud application server 200 is configured to provide DRM services, re-encryption with the current key may be prevented in order to properly preserve historical rights and privileges.

System 100 may also comprise secure application server 300. Secure application server 300 may be a presumably trusted machine, for example, it may be situated out of public cloud 10, or may have additional security measures not implemented in application server 200. Secure application server 300 may be used to regenerate the current/previous session encryption/decryption keys generated by current key generator 120 if/as necessary.

Secure application server 300 may comprise user key generator 320 and user data database 305. User data database 305 may be used to store the unique user parameters and key material used by current key generator to generate current session keys. User key generator 320 may be configured to access the unique user parameters and key material stored in user data database 305 to generate current/previous session keys in generally the same manner as current key generator 120. Secure application server 300 may therefore provide backup for decryption of personal data stored in cloud data storage unit 220 in the event that unique key data storage 105 may be corrupted or otherwise unavailable to the user of user device 110.

It will be appreciated that the user may not necessarily be aware of the protocol used by user device 110 to generate a new current session key. The protocol may be defined as a function of user input or standard policy parameters. For example, the user may be prompted to confirm or change a default frequency for generating new current session keys. The user may similarly be prompted to confirm or change a default value for the number of historical periods for which personal data may be stored on cloud data storage unit 220. It will be appreciated that the session periods may be defined by the changing of the current session key. Alternatively, the session periods may be defined in terms of actual time periods such as days, weeks or months. User device 110 may be configured to translate such policy parameters to define a current/previous session personal data protocol.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A method for securing data on a semi-trusted server, the method implemented on a computing device and comprising:

receiving on said semi-trusted server at least a current session key from a user device for use during a current session between said user and said semi-trusted server, wherein said current session key is a symmetric key for use on both said semi-trusted server and said user device during at least said current session for both encrypting data and for decrypting data encrypted with said current session key and, wherein the receiving the current session key is via a cloud-based communications forwarding path from the user device to the semi-trusted server;

decrypting user encrypted communications received on said semi-trusted server from said user device during said current session with said current session key, wherein said received user encrypted communications were encrypted on said user device with said current session key;

generating server encrypted communications by encrypting communications for said user device with said current session key on said semi-trusted server;

sending said server encrypted communications to said user device to be decrypted with said current session key on said user device;

generating encrypted personal data by encrypting personal data generated during said current session with said current session key on said semi-trusted server;

storing said encrypted personal data as stored encrypted personal data on said semi-trusted server;

upon completion of said current session, limiting access to said stored encrypted personal data by removing said current session key from accessible memory of said semi-trusted server, wherein said removing comprises overwriting a memory location for said current session key with random data;

receiving said current session key from said user device during a later session, wherein said later session is subsequent to said current session; and decrypting said encrypted personal data on said semi-trusted server during said later session with said current session key.

2. The method according to claim 1 and also comprising decrypting with said current session key said stored personal data associated with said user device.

3. The method according to claim 1 and further comprising:

segmenting said stored encrypted personal data according to at least two encryption keys with which said encrypted personal data was encrypted, wherein said at least two encryption keys are said current session key and at least one previous session key, wherein said at least one previous session key had been previously provided by said user device as said current session key, and was replaced by said user device.

4. The method according to claim 3 and also comprising:

receiving said at least one previous session key; and decrypting from at least one segment of said stored encrypted personal data that was encrypted with said at least one previous session key, wherein said removing also comprises removing said at least one previous session key.

5. The method according to claim 1 wherein said semi-trusted server provides television broadcast services.

6. The method according to claim 5 wherein said personal data is associated with a personalized electronic program guide (EPG).

7. The method according to claim 1 wherein said semi-trusted server is a media content server.

8. The method according to claim 1 wherein said semi-trusted server is part of a statistical analysis system or provides medical record sharing services.

9. The method according to claim 1 and wherein said semi-trusted server is a cloud server.

10. A method for controlling access to personal data stored on a semi-trusted server, the method implemented on a computing device and comprising:
sending a current session key associated with a current session from a client device to said semi-trusted server, wherein said current session key is a symmetric key for use during at least said current session on both said client device and semi-trusted server to encrypt and decrypt personal data associated with said client device, and wherein said semi-trusted server is configured to store encrypted personal data generated by encrypting said personal data with said current session key, wherein the sent from the client device current session key is via a cloud-based communications forwarding path from the client device to the semi-trusted server and, wherein upon completion of said current session, limiting access to said stored encrypted personal data by removing said current session key from accessible memory of said semi-trusted server, wherein said removing comprises overwriting a memory location for said current session key with random data;
generating user encrypted communications by encrypting communications for said semi-trusted server during said current session with said current session key;
sending said user encrypted communications to said server during said current session; decrypting server encrypted communications received during said current session from said semi-trusted server with said current session key, wherein said received server encrypted communications were encrypted with said current session key;
facilitating decryption of said encrypted personal data during a later session by sending said current session key to said semi-trusted server, wherein said later session is subsequent to said current session;
sending a previous session key to said semi-trusted server, wherein said previous session key is a previously used current session key and is suitable for use by said semi-trusted server to decrypt said encrypted personal data from a previous session; and
receiving unencrypted personal data from said semi-trusted server, wherein said unencrypted personal data is derived from said previous session key and said encrypted personal data.

11. The method according to claim 10 and also comprising:
limiting access to said encrypted personal data stored on said semi-trusted server by replacing said current session key from time to time.

12. The method according to claim 11 wherein said replacing is per at least one of a user initiation on said client device, a periodic schedule or a random schedule.

13. The method according to claim 10 and also comprising:
generating said current session key via a key ladder function.

14. The method according to claim 10 and wherein said personal data represents a personalized electronic program guide (EPG).

15. The method according to claim 10 wherein said semi-trusted server is a cloud server.

16. A system for securing data on a semi-trusted server comprising:
means for receiving on said semi-trusted server at least a current session key from a user device for use during a current session between said user and said semi-trusted server, wherein said current session key is a symmetric key used on both said semi-trusted server and said user device during at least said current session for both encrypting data and for decrypting data encrypted with said current session key and, wherein the receiving the current session key is via a cloud-based communications forwarding path from the user device to the semi-trusted server;
means for decrypting user encrypted communications received on said semi-trusted server from said user device during said current session with said current session key, wherein said received user encrypted communications were encrypted on said user device with said current session key;
means for generating server encrypted communications and encrypted personal data by encrypting communications for said user device and said personal data generated during said current session with said current session key on said semi-trusted server;
means for storing said encrypted personal data;
means for sending said server encrypted communications to said user device to be decrypted with said current session key on said user device;
means for limiting access to said stored encrypted personal data other than during said session by removing said current session key from accessible memory of said semi-trusted server upon completion of said current session, wherein said removing comprises overwriting a memory location for said current session key with random data;
means for receiving said current session key from said user device during a later session, wherein said later session is subsequent to said current session; and
means for decrypting said encrypted personal data on said semi-trusted server during said later session using said current session key.

17. The system according to claim 16 wherein said semi-trusted server is a cloud server.

* * * * *